United States Patent [19]

Foreman et al.

[11] 3,998,142

[45] Dec. 21, 1976

[54] AIR CIRCULATING SYSTEM FOR ULTRA CLEAN AREAS

[75] Inventors: Robert E. Foreman; Casimir S. Strozewski, both of Santa Ana, Calif.

[73] Assignee: Sterilaire Medical, Inc., Santa Ana, Calif.

[22] Filed: July 3, 1975

[21] Appl. No.: 593,023

[52] U.S. Cl. .................................. 98/36; 128/1 R; 55/97
[51] Int. Cl.² ...................... B01D 46/00; F24F 9/00
[58] Field of Search ............. 98/36, 33 A; 55/473, 55/97, 350, 279, 385 A, 410, 413, 414, DIG. 29, 482–484; 128/1 R, 371, 145, 139; 21/53, 74 R

[56] References Cited
UNITED STATES PATENTS

| | | | |
|---|---|---|---|
| 3,380,369 | 4/1968 | Allander | 98/36 |
| 3,518,046 | 6/1970 | Cicirello | 21/53 |
| 3,626,837 | 12/1971 | Pelosi, Jr. | 98/36 |
| 3,721,067 | 3/1973 | Agnew | 128/1 R |
| 3,726,203 | 4/1973 | Lindestrom | 98/36 |
| 3,726,204 | 4/1973 | Lindestrom | 98/36 |

FOREIGN PATENTS OR APPLICATIONS
2,142,795  3/1972  Germany ............................ 98/36

Primary Examiner—William E. Wayner
Assistant Examiner—Henry C. Yuen
Attorney, Agent, or Firm—Allan R. Fowler

[57] ABSTRACT

An air circulating console is disclosed which produces an ultra clean area suitable for performing surgical operations by first removing bacteria from the air and then forcing this ultra clean air at low velocity and in laminar fashion horizontally from the console to engulf an operation table, surgical team and associated equipment. The effective zone of ultra clean air is projected over a large area with the assistance of a pair of vertical high velocity air curtains emitted at an angle toward the ultra clean air from a pair of air curtain plenums which protrude from the console on opposite sides thereof. Air is returned to the console via a pair of intake ducts positioned on opposite sides thereof, rearward and outboard of the air curtain plenums. The air flow pattern generated by the console in a closed room exhibits a lifting effect which discourages the settling of bacteria.

13 Claims, 9 Drawing Figures

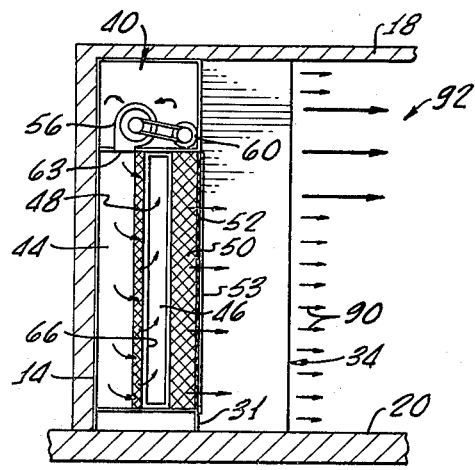
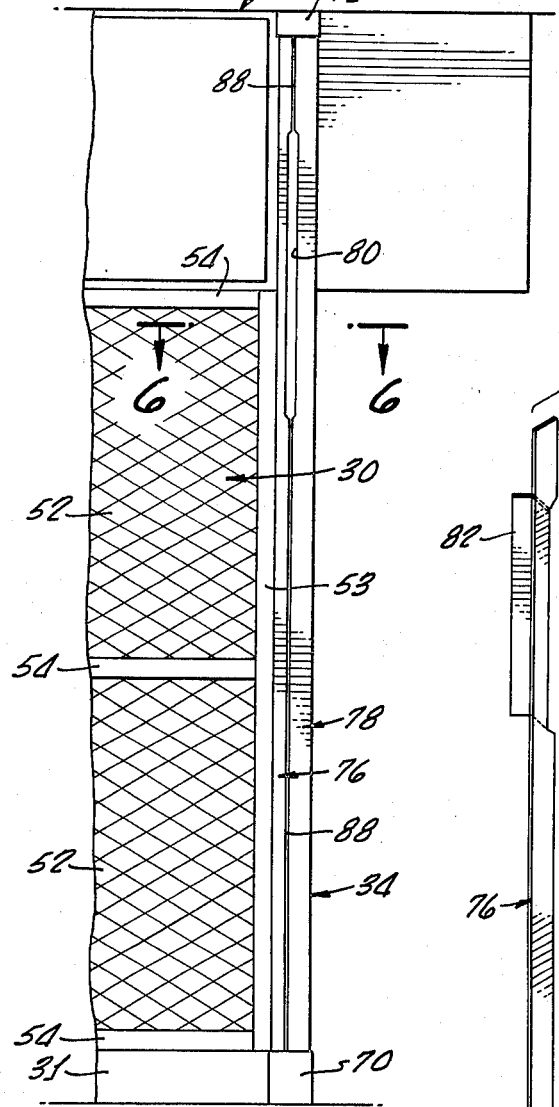
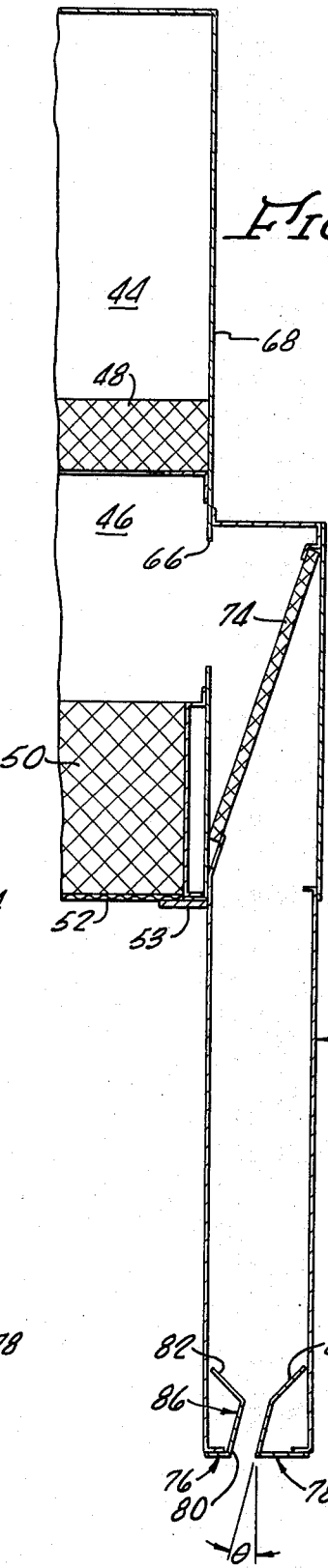

AIR CIRCULATING SYSTEM FOR ULTRA CLEAN AREAS

This invention relates to sepsis control, and has partciular reference to an air filtering and circulation system for providing an aseptic atmosphere about a patient, surgical team or other medical attendants and associated equipment in a patient operating or recovery room. Such systems may be generally referred to as surgery modules, although they are not strictly limited to surgery use.

Present day preoperative procedures involve sterilization of equipment, operating room and surgical garments. However, even with the wearing of sterilized outer garments and masks, the bacteria count within an operating room is often between 15 and 70 bacteria per cubic foot, which for many operations can result in an unacceptable infection rate as high as 9 percent. The source of much of the bacteria present in an operating room is the operating personnel themselves. It has been estimated that approximately 80 percent of bacteria present is shed by the surgical team.

Conventionally, a surgery module or air circulating console is designed to provided an ultra clean area in an operating room by removing airborne bacteria from the return air and attempting to create a non-turbulent or "laminar" airflow of the ultra clean air over the patient and surgical team so as to sweep any airborne bacteria shed by the surgical team away from the patient. In attempting to extend the effective area encompassed by the ultra clean air, various conventional consoles have attempted to confine the ultra clean airflow with high-speed air or with air deflectors, so as to avoid the use of fixed panels which extend alongside the operating area and interfere with the mobility of the surgical team and associated equipment.

We have invented an air circulation system which employs air curtains in a manner that extends the effective ultra clean area to a greater extent than heretofore possible without the use of fixed panels. Moreover, this is accomplished in a console design which conserves space and energy, minimizes airflow noise, and does not require excessive air velocity in the ultra clean airflow.

In accordance with our invention, the air circulating system includes an upright blower and filter assembly, a pair of air curtain plenums in fluid communication with the assembly, and air return means communicating with the assembly. The assembly includes a frontal air discharge face and means for emitting a relatively low velocity flow of ultra clean air outwardly from the face. The pair of air curtain plenums are respectively disposed adjacent opposite side edges of the air discharge face, and each plenum includes air channeling means for emitting an approximately vertical curtain of relatively high velocity air with approximate horizontal flow at an acute angle inwardly toward the relatively low velocity ultra clean airflow from the assembly face.

In one embodiment of our invention, the air curtain plenums each comprise an upright structure which extends substantially from top to bottom of the assembly and protrudes a short distance outwardly beyond the air discharge face, the top edge of the air discharge face lies a substantial distance below the top of the assembly, the air channeling means in each plenum includes means for restricting at least the major portion of the energy in the air curtain emission to a vertical zone near the top of the air discharge face, and the air return means are disposed on opposite sides of the assembly and are somewhat isolated from the main air thrusts by being located at a level near the top of the air discharge face or above and effectively rearward and outboard relative to the air curtain plenums.

In this embodiment of our invention, the blower and filter assembly contains both pre-filters and final filters through which the air passes in order to form a relatively low velocity ultra clean air stream. Consistent with the need for clean, high velocity air in the air curtain emission, while minimizing blower energy requirements and air noise, air for the air curtain plenums is derived from the assembly at a point between the pre-filters and final filters and flows through additional pre-filters in the air curtain plenums prior to emission.

These features, both singly and in combination, account to varying degrees for a number of advantages, for example: an extension of the effective ultra clean area; an air lift effect; a return air isolation enabling system installation as a free standing console without the necessity for extensive duct work or other room addition or modification; and a cost, space and air noise savings.

The foregoing and other features and advantages will be apparent from the following specification describing a preferred embodiment of the invention, taken in conjunction with the accompanying drawings, in which:

FIG. 4 is a sectional elevation taken along line 4 — 4 of FIG. 2;

FIG. 5 is a fragmentary front elevation of the apparatus of FIG. 1, showing an air curtain plenum face with the slots for emitting the high velocity air curtain and a return air intake duct;

FIG. 6 is an enlarged sectional view taken on line 6 — 6 of FIG. 5 showing the air channeling means of an air curtain plenum, including fairings leading to an acute angle emitting slot, secondary filter and an opening into a filter compartment of the console;

FIG. 7 is a perspective view of the fairings and face plate of an air curtain plenum which angularly directs and confines the major air curtain energy to an acute angle at an elevated location;

Figure 8:
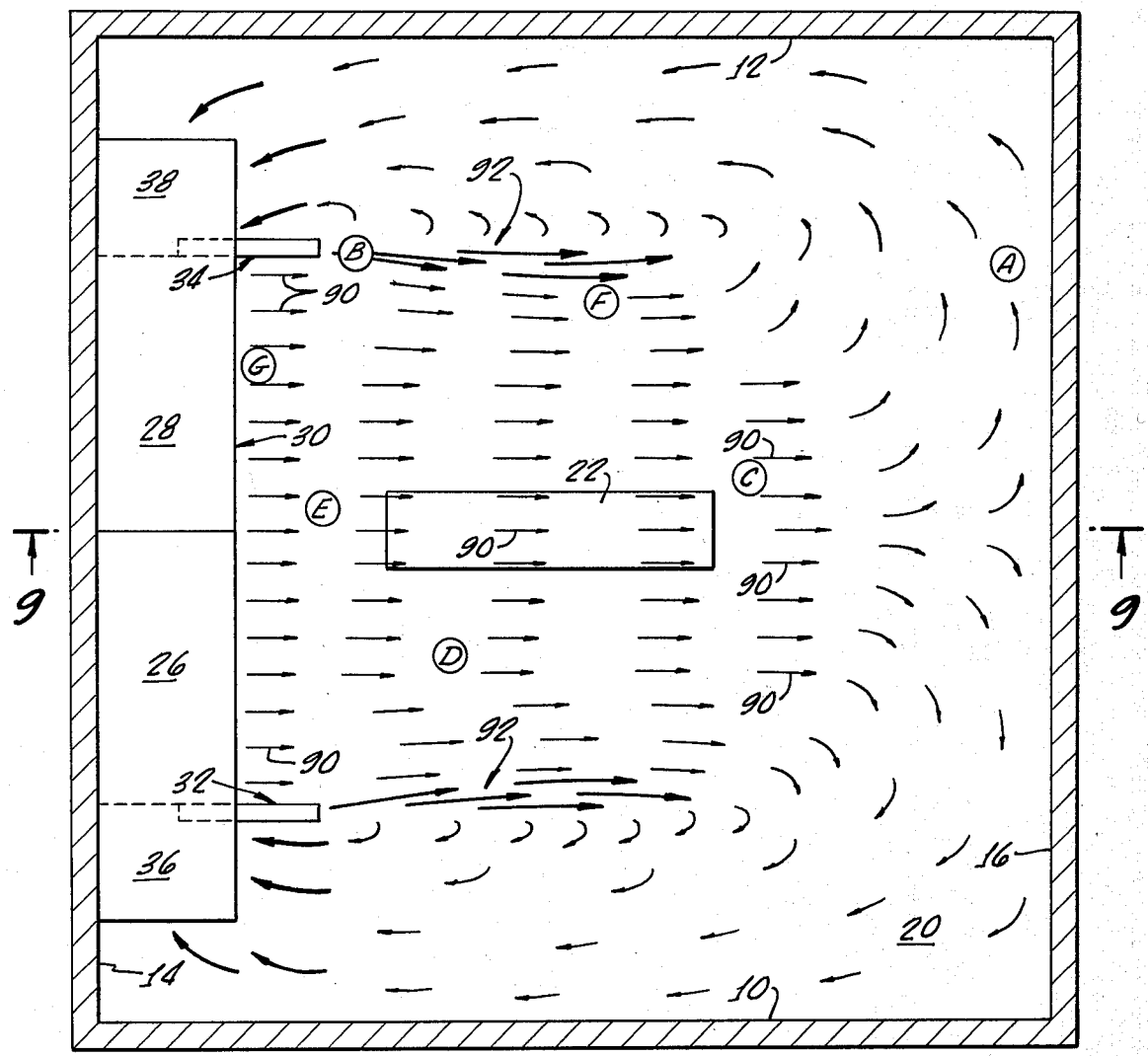
Figure 9:
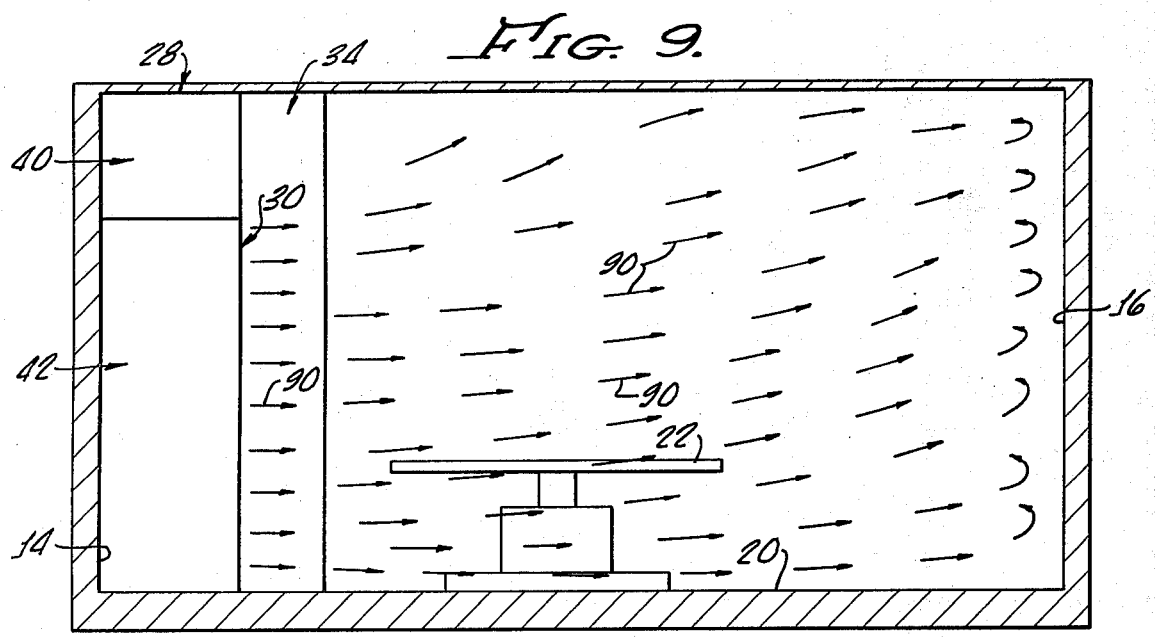

FIG. 8 is an overhead view of the console within a room showing the airflow patterns past the operating table, the containment of the ultra clean low velocity air by the air curtain streams emitted by the air curtain plenums, and the return airflow into the air return intake openings; and, FIG. 9 is a sectional view of the console within a room taken along line 9 — 9 of FIG. 8, showing the lifting pattern of the airflow past the operating table.

Figure 1:
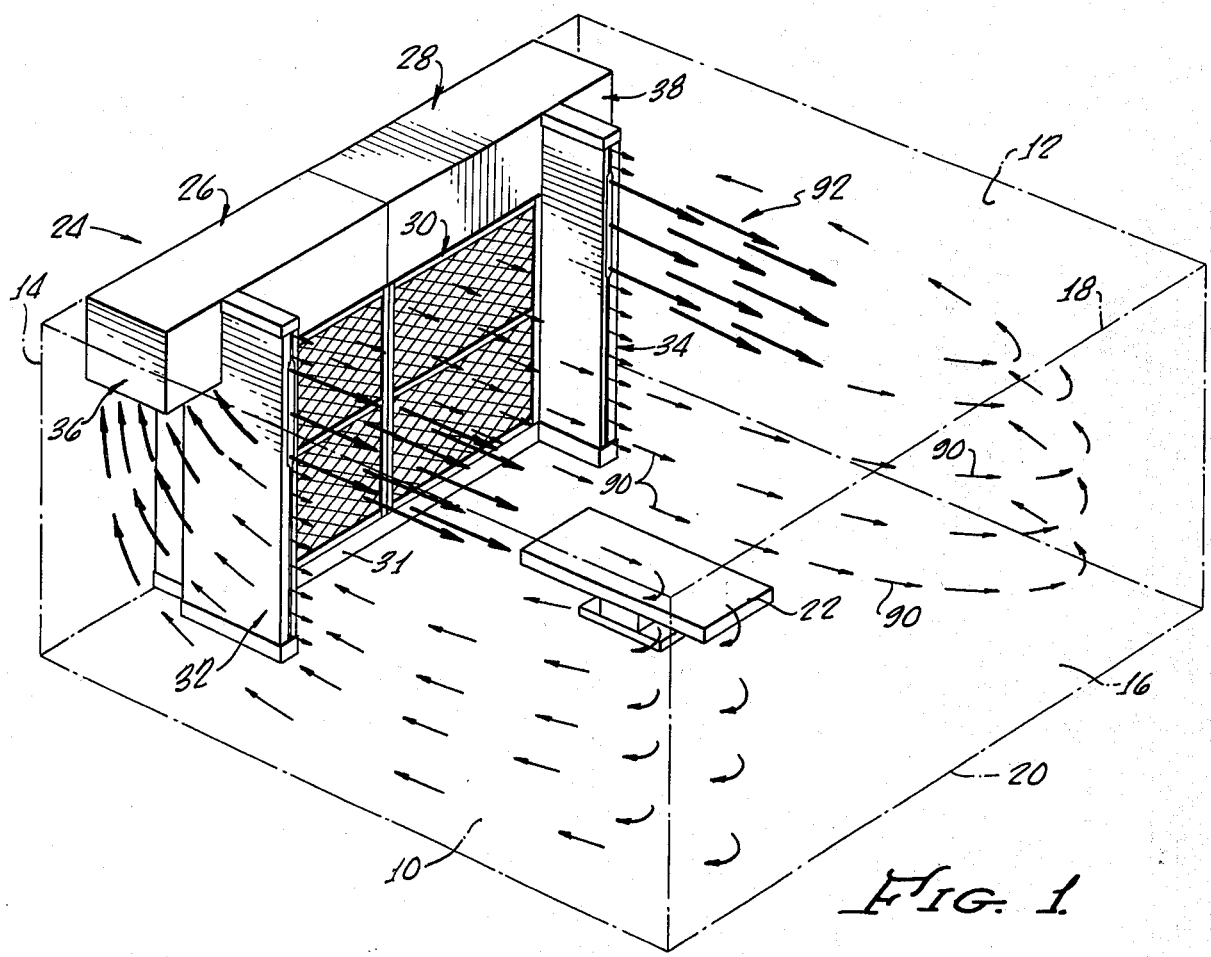
FIG. 1 is an overall prespective view of a preferred embodiment of the invention installed within an operating room shown in phantom line, and showing an operating table and the general airflow pattern.

FIG. 1 shows, in phantom line, a conventional hospital operating room having opposite side walls 10 and 12, proximal and distal end walls 14 and 16, a ceiling 18 and floor 20. The size of the average room is approximately 10 feet in height, 20 feet long and 20 feet wide. as is customary, positioned near the center of the room is an operating table 22, approximately equal distance from all walls. Not shown in the figure are the patient, surgical team, associated operating equipment and overhanging lights and fixtures.

The preferred embodiment of the present invention, an air circulating console 24, is shown positioned against the proximal end wall 14 equidistant from the side walls 10 and 12 and extends substantially from the floor 20 to the ceiling 18. The console 24 includes an upright blower and filter assembly composed of two side by side blower and filter sections 26 and 28, each providing half of a composite air discharge face 30 and resting on a common base 31, and a pair of air curtain plenums 32, 34 and air intake ducts 36, 38 disposed on opposite sides of the assembly. The console 24 is of conventional steel frame and sheet metal construction, and since the blower and filter sections, the air curtain plenums and the air intake ducts are in each instance identical mirror image constructions, common reference numerals will be used for certain of their features.

Figure 2:
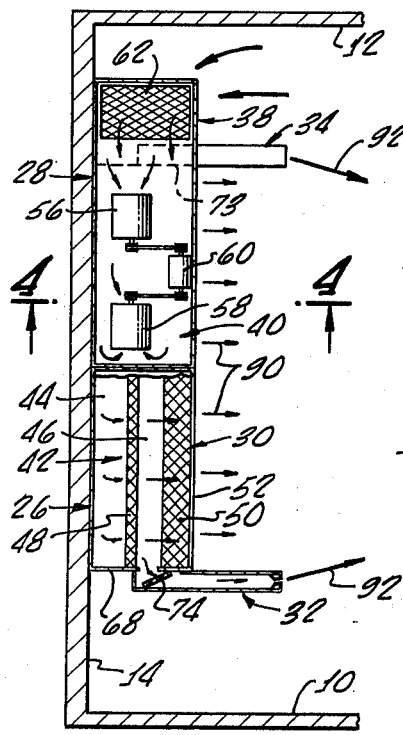
FIG. 2 is a top view of the apparatus of FIG. 1, within the operating room, partially cut away, showing among other things blowers, a blower motor pre-filters, final filters and the opening between the pre-filters and final filters to the air curtain plenums.
Figure 3:
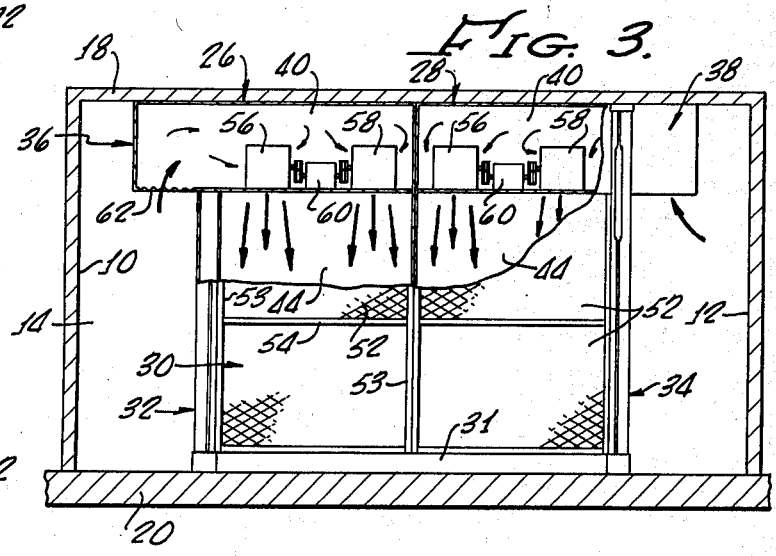
FIG. 3 is a front elevation of the apparatus of FIG. 1, within the operating room, partially cut away, showing among other things the upper blower compartments of the console with the blowers and motors, and the airflow through the intake ducts through the blower compartments to the lower filter compartments.

Referring principally to FIGS. 2, 3 and 4, each blower and filter section has an upper blower compartment 40 and a lower filter comparrtment 42. The lower compartment is divided vertically into rear and front chambers 44, 46 by a rear panel of polyester pre-filters 48 and a front panel of final high efficiency particulate air filters 50. The pre-filters and final filters are those conventionally used in surgery modules. The front panel of final filters 50 is covered on its front surface by a rectangular metal grating 52 supported by vertical and horizontal members 53, 54 as shown, and comprises a portion of the air discharge face 30 of the console from which the ultra clean air stream is emitted.

The upper blower compartment 40 of each blower and filter section contains two belt driven blowers 56, 58 powered by a motor 60. The air return ducts 36, 38 are formed as an extension of the blower compartments 40, and each have a single downwardly facing air intake port covered by a metal grating, as indicated at 62.

With the blowers in operation, return air is drawn into the upper blower compartments 40 of each blower and filter section 26, 28 through the air intake ports 62 of the associated air return ducts 36, 38. This air is pressurized by the blowers 56, 58 in each section, and forced through openings by the blower exhausts (such as indicated at 63, FIG. 4) from the upper blower compartment 40 into the rear chamber 44 of the lower filter compartment 42. This high pressure air moves through the pre-filter panel 48 and into the front chamber 46 which lies between the pre-filters and final filters. At this point the air is still highly pressurized and moves through the final filter panel 50, whereby it undergoes a substantial pressure drop to emerge from the air discharge face 30 as an ultra clean air stream of sufficient dimension of engulf a plurality of human beings. The final filters are very fine and remove particulate matter from the air with about 99.99% efficiency even at 0.5 micron particle size.

Further, the highly pressurized air from the front chamber 46 of the filter compartment 42 is supplied and regulated by an elongated rectangular vertical opening 66 in the outboard side wall 68 of the filter compartment 42 to the associated one of the air curtain plenums 32, 34.

As best seen in FIGS. 2 and 5 to 7, the air curtain plenums 32, 34 are upright, relatively thin, hollow rectangular structures which extend from the bottom to the top of the console on opposite sides of the blower and filter assembly adjacent the outer side edges of the air discharge face 30. The plenums 32, 34 protrude forward past the air discharge face 30 for a short distance; that is, a distance which is small compared to the width of the air discharge face.

Each air curtain plenum is of composite sheet metal construction as shown and is provided with a base 70 and a top cap 72. Each plenum is connected to the outboard side wall 68 of the associated filter and blower section, and extends rearward to encompass the vertical air feed opening 66 in this wall 68 by being foreshortened at its rear to extend under a portion of the associated return air duct (as indicated at 73, FIG. 2). Interiorly, each plenum includes a secondary pre-filter 74 mounted opposite the air feed opening 66 near the foreshortened rear of the plenum. All air fed into the plenum must pass through this secondary pre-filter prior to emission.

Each air curtain plenum has a front forward face formed by a pair of elongated sheet metal fairings 76, 78 which extend from top to bottom of the plenum. At the front face, these fairings form a relatively wide, vertical air emission slot 80 restricted to an elevated zone approximately bisected by the level of the top of the air discharge face 30 and relatively small in vertical extent compared to the height of the console. Adjacent the margins of the relatively wide slot 80, the fairings 76, 78 have interior extensions 82, 84 respectively which form an approximately rectangular throat 86 or extension of the slot 80 interiorly of the plenum at an acute angle of about 15° measured inwardly from the forward direction. The interior extensions 82, 84 streamline the air emission from the slot and provided a columnated, high velocity air curtain emission at an acute angle inwardly toward the relatively low velocity ultra clean airflow from the air discharge face 30 of the console.

Above and below the relatively wide slot 80 in the vertical front face of each air curtain plenum, the fairings become more proximate and form a relatively narrow vertical air emission slot 88 which extends along the major portion of the height of the console. This slot 88 is about one third as wide as the relatively wide slot (for example, one-fourth inch as compared to three-fourths inches) and the fairings do not include any internal extensions along its margins.

The general airflow pattern is designated by the flow arrows depicted in the various figures, with the general scheme being to depict higher velocity airflow with longer arrows.

As best seen in FIGS. 1, 8 and 9, the frontal air discharge face 30, by means of the blowers, filters and compartments in the side by side blower and filter sections, emits a relatively low velocity flow of ultra clean air outwardly from the console cabinet toward the opposite or distal wall 16 of the room. The wide discharge face 30, having a height greater than normal human beings, dictates that the ultra clean airflow therefrom is sufficient to engulf the operating table and a plurality of human beings disposed thereabout. The airflow from the face 30 is emitted in a uniform manner normal to the surface, at a velocity of about 100 feet per minute. This is depicted by the airflow arrows, as indicated at 90. The objective, of course, is to extend this uniform ultra clean airflow over as large an area as possible, having in mind that this airflow is attempting to expand, and particularly so under the influence of the air return ducts 36, 38. It is, therefore, encumbent to achieve a certain amount of isolation from these air return ducts.

The isolation is achieved by means of the protrusion of the air curtain plenums 34, 36, the high velocity air curtains emitted therefrom, and by the location of the air intake ducts, 36, 38 which are disposed on opposite sides of the assembly, with the air intake port of each duct being disposed at an elevated location near or above the top of the air discharge face 30 and outboard of and toward the rear of the air curtain plenums, with the air intake ports facing downwardly.

In regard to the air curtains, the general configuration of the plenums, the secondary pre-filters 74, and the fairings 76, 78 particularly in the area of the relatively wide slot 80, constitutes an air channeling means communicating with the assembly through the opening 66 for emitting an approximate vertical primary air curtain, generally indicated at 92, of relatively high velocity air at a 15° angle inwardly toward the relatively low velocity ultra clean airflow. The fairings providing for the wide slot 80, and the internal extensions 82, 84 thereof adjacent the margins of this wide slot, effectively concentrate the major portion of the energy in the total air curtain emission to the vertical zone of the slot 80 at a level near the top of the air discharge face 30.

By emitting the majority of the air curtain energy inwardly at an angle of 15°, there is a confining action on the ultra clean airflow which, in opposition to the effect of the air intake ducts, extends the ultra clean area outwardly from the console. Concentration of the air curtain energy in the zone of the wide slot 80 conserves energy and reduces the air noise that would be occasioned by an attempt to operate the entire front surface of the air plenum at the level of air emission energy. The extension of secondary air curtains emitted from the relatively narrow slots 88 in each plenum assists in reducing short circuiting of the ultra clean air back to the intake ducts.

As determined by smoke testing, the present invention will produce an air flow pattern similar to that shown in FIGS. 8 and 9. These measurements were made in an operating room with a table but no associated equipment or surgical team. The high velocity primary air curtain is emitted at an angle to the low velocity ultra clean air 90; however, as shown by the smoke test, at some distance in front of the console 24 the primary air curtain appears to straighten out. This is caused by the expansion or diffusion of the low velocity ultra clean air toward the side walls 10 and 12 of the room under the influence of the air return ducts. The emission of the primary air curtain at an elevated location tends to counteract this diffusion and maintain a steady, uniform, laminar ultra clean air flow in front of the console 24 past the operating table 22 with sufficient room for a surgical team and associated equipment to perform an operation. After the ultra clean air flows past the operating table 22 it impinges on the opposite end wall 16 and then returns to the intake ducts 46 outboard of the air curtain plenums 32, 34 and the ultra clean area surrounding the table 22.

Smoke testing also reveals a lifting action within the airflow produced by the present invention. While the reason for this lifting action is not known to a scientific certainty, it is hypothecated that the effect is the result of a combination of several features of this invention. For example, the low velocity laminar ultra clean airflow 90 is forced into the room a substantial distance from the ceiling of the room, by virtue of the top of the air discharge face 30 being spaced a substantail distance downwardly from the top of the console. Since air will tend to expand or diffuse into the entire volume of the room, this air will move upward toward the ceiling as it moves out from the console 24 towards the opposite wall 16 and down towards the floor. Because there is a greater volume above the discharge face 30 than below, more air will diffuse upward causing the lifting action to be greater in the upper half of the room than in the lower half of the room. Second, the high velocity air curtains tend to confine the ultra clean air in front of the console. This prevents appreciable diffusion of the low velocity air 90 toward the side walls 10 and 12, hence enhancing the expansion of this air toward the ceiling 18 of the room. Third, it is evident that since the intake ducts 36, 38 are located near the top of the blower and filter sections, with their intake ports facing downwardly at a level near or above the top of the air discharge face 30, all air emitted into the room by the discharge face 30 must be exhausted at the higher air return level, that is, above the low velocity air emission level.

While the various features of the console of our invention will also provide a superior performance when outfitted with extensive air return duct work, for example duct work returning air from a high location on the distal wall of the room, it is significant that acceptable performance is also obtained with the simple ducts 36, 38 forming part of the free standing console by virtue of their isolation achieved in the structural combination.

The typical bacteria count of between 15 and 60 per cubic foot is reduced to effectively zero using this described console. Bacteria count tests are typically made by placing Petri settle dishes at various points within an operating room during an actual operation. Following the operation the dishes are cultured and the number of colonies counted after a period of time. FIG. 8 shows the positions of the Petri settle dishes during a typical test of the present invention. The span of time during the operation was two hours and fifteen minutes and the round circles labelled A, B, C, D. E, F, and G in FIG. 8 show the location of the Petri dishes during this operation. The settle dishes A, B and G were placed on the floor of the room whereas the settle dishes C, D. E and F were placed at approximately the level of the top of the surgery table 22. After culturing, the number of colonies found in the settle plates A, B, C, D and E was zero. The number of colonies found in the Petri settle plate F was one, and the number in Petri settle plate G was two. Since the dishes F and G cannot be considered to be within the ultra clean area surrounding the operating table, the effective bacteria count within the ultra clean area was zero for this test.

Thus this present invention is able to produce an ultra clean area surrounding an operating table and surgical team using laminar flow, ultra clean low velocity air of approximately 100 feet per minute which produces a proven bacteria free area without desiccation of the wound. Furthermore, since the equipment may be selfstanding and portable, it can be installed in any existing operating room and with no requirement for structural modification of the room. The air circulation console does not require an abnormal amount of power because of efficient use and balance of high and low velocity airflow. For the same reason it does not produce excessive noise as is evidenced by a measured sound level of approximately 58 dB(A).

In addition the present invention represents an efficient and minimum use of floor space by utilizing narrow high velocity air stream to confine laminar flow low velocity air.

What is claimed is:

1. An air circulating system for providing an ultra clean air space sufficiently large to engulf a plurality of human beings in a room, comprising:
   an upright blower and filter assembly, having a frontal air discharge face and means including final filters disposed adjacent said face for emitting a relatively low velocity laminar flow of ultra clean air approximately horizontally outwardly from said face;
   a pair of upright air curtain plenums respectively disposed adjacent opposite side edges of said discharge face and in fluid communication with said assembly;
   each air curtain plenum having a frontal approximately vertical air discharge slot therein and having air channeling means, independent of said final filters, for emitting adjacent the ultra clean air discharge face, a separate and approximately vertical air curtain of relatively high velocity air with approximate horizontal flow, said air channeling means being constructed to direct air at an acute angle inwardly toward the relatively low velocity ultra clean airflow from said ultra clean air discharge face; and
   air return means coupled to said assembly.

2. An air circulating system for providing an ultra clean air space sufficiently large to engulf a plurality of human beings in a room, comprising:
   an upright blower and filter assembly, having a frontal air discharge face and means including final filters disposed adjacent said face for emitting a relatively low velocity laminar flow of ultra clean air approximately horizontally outwardly from said face;
   a pair of upright air curtain plenums respectively disposed adjacent opposite side edges of said ultra clean air discharge face and in fluid communication with said assembly;
   each air curtain plenum having a frontal approximately vertical air discharge slot therein and having air channeling means, independent of said final filters, for emitting adjacent the ultra clean air discharge face, a separate and approximately vertical air curtain of relatively high velocity air with approximate horizontal flow, said air channeling means being constructed to direct air at an acute angle inwardly toward the relatively low velocity ultra clean airflow from said ultra clean air discharge face;
   each air channeling means including means for restricting at least the major portion of the energy in the air curtain emission to a vertical zone near the top of said air discharge face; and
   air return means communicating with said assembly.

3. An air circulating system for providing an ultra clean air space sufficiently large to engulf a plurality of human beings in a room comprising:
   an upright blower and filter assembly, having a relatively wide frontal air discharge face and means including final filters disposed adjacent said face for emitting a relatively low velocity laminar flow of ultra clean air approximately horizontally outwardly from said face;
   a pair of upright air curtain plenums respectively disposed adjacent opposite side edges of said ultra clean air discharge face and protruding approximately perpendicularly outward therefrom for a substantial distance which is small compared to the width of said face;
   each air curtain plenum having a frontal approximately vertical air discharge slot therein and having air channeling means communicating with said assembly but independent of said final filters, for emitting adjacent the ultra clean air discharge face, a separate and approximately vertical air curtain of relatively high velocity air with approximate horizontal flow, at an acute angle inwardly toward the relatively low velocity ultra clean airflow from said ultra clean air discharge face; and
   air return means having inlets disposed at and communication with said assembly.

4. The apparatus of claim 2 wherein the air return means is confined to a pair of air intake ducts disposed on opposite sides of the assembly, each duct having an air intake port disposed at an elevated location outboard of an toward the rear of said air curtain plenums.

5. An air circulating console for providing an ultra clean air space sufficiently large to engulf a plurality of human beings, comprising:
   an upright blower and filter assembly, having a frontal air discharge face which extends across the major portion of the width of the assembly and from near the bottom of the assembly to a location spaced a substantial distance from the top of the assembly, and means including final filter disposed adjacent said face for emitting a uniform relatively low velocity laminar flow of ultra clean air approximately horizontally outwardly from said face;
   a pair of upright air curtain plenums respectively disposed adjacent opposite side edges of said ultra clean air discharge face and protruding approximately perpendicularly outward therefrom for a substantial distance which is small compared to the width of said face, and extending for substantially the full height of the assembly;
   each air curtain plenum having a frontal approximately vertical air discharge slot therein and having air channeling means communicating with said assembly but independent of said final filters for emitting adjacent the ultra clean air discharge face a separate and approximately vertical air curtain of relatively high velocity air with approximate horizontal flow, at an acute angle inwardly toward the relatively low velocity ultra clean airflow from said face;
   each air channeling means including means for restricting at least the major portion of the energy in the air curtain emission to a vertical zone near the top of said air discharge face; and,
   air return means disposed on opposite sides of said assembly.

6. An air circulating console for providing an ultra clean air space sufficiently large to engulf a plurality of human beings comprising:
- a blower and filter assembly having at least one filter section with each section having a relatively wide discharge face of height greater than said human beings, and means including final filters disposed adjacent said face for emitting a relatively low velocity laminar flow of ultra clean air approximately horizontally outwardly from said discharge face;
- a pair of upright air curtain plenums in fluid communication with said blower and filter assembly on opposite sides thereof, said air curtain plenums being disposed adjacent opposite side edges of said ultra clean air discharge face, each air curtain plenum protruding in front of said air discharge face and approximately perpendicularly thereto, to a position beyond the discharge face in said filter section, each air curtain plenum having means to clean air and each air curtain plenum having a frontal approximately vertical air discharge slot therein and air channeling means for emitting adjacent the ultra clean air discharge face a separate and approximate vertical, relatively narrow air curtain of relatively high velocity clean air with approximate horizontal flow, at an acute angle to the ultra clean air discharge face inwardly toward the relatively low velocity ultra clean air flow; and
- means, in fluid communication with said blower and filter assembly upstream of said final filters, on opposite sides of said blower and filter assembly, outboard of said air curtain plenums, and limited to an elevated location near the top of the assembly, for intaking air.

7. An air circulating console for providing an ultra clean air space within a closed room having a ceiling, floor, side and end walls without structure modification in the room; said ultra clean air space of sufficient size to engulf a plurality of human beings and said console comprising:
- a blower and filter assembly having at least one filter section positioned adjacent one end wall of room; each filter section having a relatively wide discharge face with height greater than said human beings, yet substantially less than the height of the room, and means including final filters adjacent said face for ultra cleaning air and emitting a uniform, relatively low velocity laminar flow of ultra clean air outwardly from said discharge face toward the opposite end wall of said room;
- a pair of upright air curtain plenums in fluid communication with said blower and filter assembly on opposite sides thereof, said air curtain plenums being disposed adjacent opposite side edges of said ultra clean air discharge face, each air curtain plenum protruding in front of said air discharge face and approximately perpendicularly thereto, to a position beyond the discharge face in said filter section, each air curtain plenum having means to clean air, and each air curtain plenum having a frontal approximately vertical air discharge slot therein and air channeling means for emitting adjacent the ultra clean air discharge face, a separate and approximate vertical, relatively narrow, air curtain of relatively high velocity clean air with approximate horizontal flow, at an acute angle to the ultra clean air discharge face inwardly toward the relatively low velocity ultra clean air flow; and
- means, in fluid communication with said blower and filter assembly, on opposite sides thereof, outboard of the relatively high velocity air curtains, for returning air to said blower and filter assembly upstream of said final filters.

8. An air circulating console for providing an ultra clean air space within a closed room having a ceiling, floor, side and end walls without structural modification of the room; said ultra clean air space of sufficient size to engulf a plurality of human beings and said console comprising:
- a relatively wide upright blower and filter assembly positioned adjacent one end wall of said room extending substantially from floor to ceiling of said room and centered between the side walls of the room, said blower and filter assembly including two mirror image filter sections positioned side by side, with each section having an air discharge face, extending substantially the full width of each filter section from near the base thereof to some distance from the top thereof and means including final filters adjacent said face for emitting a uniform, relatively low velocity laminar flow of ultra clean air outwardly from said discharge face toward the opposite end wall of the room;
- a pair of upright air curtain plenums adjacent to said blower and filter assembly on opposite sides thereof, said air curtain plenum being disposed adjacent opposite side edges of said ultra clean air discharge face, each air curtain plenum protruding in front of said air discharge face and approximately perpendicularly thereto to a position beyond the discharge face, each air curtain plenum having means to clean air, and each air curtain plenum having a frontal approximately vertical air discharge slot therein and air channeling means for emitting adjacent the ultra clean air discharge face, a separate and approximate vertical, relatively narrow, air curtain of relatively high velocity clean air with approximate horizontal flow, at an acute angle to the ultra clean air discharge face inwardly toward the relatively low velocity ultra clean air flow; and
- means, in fluid communication with said blower and filter assembly, on opposite sides thereof, outboard of the relatively high velocity air curtains, for returning air to each filter section upstream of said final filters.

9. The console recited in claim 8 wherein said means for returning air is limited to a pair of ducts each with a horizontal opening disposed at a height above the floor of the room at least that of the level of the top of the discharge face.

10. The console recited in claim 7 wherein said means for ultra cleaning air and emitting a flow of ultra clean air further includes a set of prefilters; said fluid communication between each air curtain plenum and said filter section occurs through an opening in the side of each filter section at a point upstream from said final filters and downstream from said prefilters, whereby said opening in each filter section regulates the quantity of air passing from the blower cabinet to the air curtain plenums.

11. An air circulating console for providing an ultra clean air space within a closed room having a ceiling, floor, side and end walls, without structural modification of the room; said ultra clean air space of sufficient size to engulf a plurality of human beings and said console comprising:

a relatively wide upright blower and filter assembly positioned adjacent one wall of said room extending substantially from floor to ceiling of said room and centered between the side walls of the room said blower and filter assembly including two mirror image filter sections positioned side by side, with each section including means for ultra cleaning air and an air discharge face, extending substantially the full width of each filter section from near the base thereof to some distance from the top thereof for emitting a uniform, relatively low velocity flow of ultra clean air outwardly from said discharge face towards the opposite end wall of the room, said means for ultra cleaning air including a set of prefilters and a set of secondary filters;

a pair of air curtain plenums adjacent to said blower and filter assembly on opposite sides thereof, each said air curtain plenum being in fluid communication with one filter section and each air curtain plenum protruding in front of said blower and filter assembly to a position beyond the discharge face, said means to clean air in each air curtain plenum including a secondary filter and air channeling means for emitting a separate and approximate vertical, relatively narrow, curtain of relatively high velocity clean air with approximate horizontal flow, at an acute angle to the front of said blower and filter assembly inwardly toward the relatively low velocity ultra clean air flow, said fluid communication between each air curtain plenum and one filter section occuring through an opening in the side of each filter section upstream from said secondary air filters and downstream from said prefilters, whereby said opening in each filter section regulates the quantity of air drawn from the blower and filter assembly to the air curtain plenums, said air channeling means for emitting air including fairings leading to at least one slot on the front face of each air curtain plenum; and, means, in fluid communication with said blower and filter assembly on opposite sides thereof, outboard of the relatively high velocity curtains of air, for returning air to each filter section upstream of said means for ultra cleaning air, said means for returning air including a pair of ducts each with a horizontal opening disposed at a height above the floor of the room at least that of the level of the top of the discharge face.

12. An air circulating console for providing an ultra clean air space within a closed room having a ceiling, floor, side and end walls, without structural modification of the room; said ultra clean air space of sufficient size to engulf a plurality of human beings and said console comprising:

a relatively wide upright blower and filter assembly positioned adjacent against one end wall of said room extending substantially from floor to ceiling of said room and centered between the side walls of the room, said blower and filter assembly including two mirror image filter sections positioned side by side, with each section including means for ultra cleaning air and an air discharge face, extending substantially the full width of each filter section from near the base thereof to some distance from the top thereof for emitting a uniform, relatively low velocity flow of ultra clean air outwardly from said discharge face toward the opposite end wall of the room;

a pair of air curtain plenums adjacent to said blower and filter assembly on opposite sides thereof; and, means, in fluid communication with said blower and filter assembly, on opposite sides thereof, outboard of the relatively high velocity curtains of air, for returning air to each filter section upstream of said means for ultra cleaning air, said means for returning air including a pair of ducts each with a horizontal opening and disposed at a height above the floor of the room at least that of the level of the top of the discharge face, each said air curtain plenum being in fluid communication with one filter section and each air curtain plenum protruding in front of said blower and filter assembly to a position beyond the discharge face, each air curtain plenum extending substantially from floor to ceiling of the room, each air curtain plenum including a secondary filter and air channeling means for emitting a separate and approximate vertical, relatively narrow, curtain of relatively high velocity clean air with approximate horizontal flow, at an acute angle to the front of said blower and filter assembly inwardly toward the relatively low velocity ultra clean air flow, said air channeling means including an air plenum face having one slot with a length substantially less than the height of the air plenum, said slot being spaced from the top of the air curtain plenum at about the level of the duct openings.

13. An air circulating system for providing an ultra clean air space sufficiently large to engulf a plurality of human beings in a room, comprising:

an upright blower and filter assembly, having a frontal air discharge face and means including final filters disposed adjacent said face for emitting a relatively low velocity laminar flow of ultra clean air approximately horizontally outwardly from said face;

a pair of upright air curtain plenums respectively disposed adjacent opposite side edges of said ultra clean air discharge face and in fluid communication with said assembly;

each air curtain plenum having a frontal approximately vertical air discharge slot therein and having air channeling means independent of said final filters for emitting adjacent the ultra clean air discharge face, a separate and approximately vertical air curtain of relatively high velocity air with approximate horizontal flow, said air channeling means being constructed to direct air at an acute angle inwardly toward the relatively low velocity ultra clean air flow from said discharge face;

each air channeling means including means for restricting at least the major portion of the energy in the air curtain emission to a vertical zone near the top of said air discharge face; and air return means having inlets disposed at and communicating with said assembly, on opposite sides thereof, outboard of the relatively high velocity air curtains, for returning air to the filter assembly, said inlets having a horizontal opening limiting the intake of air to a zone near the vertical zone of the major emission of air from the air channeling means.

* * * * *